April 7, 1970 R. I. ZALLES 3,505,175
LIQUID PURIFYING APPARATUS AND METHOD
Filed May 19, 1967 2 Sheets-Sheet 1

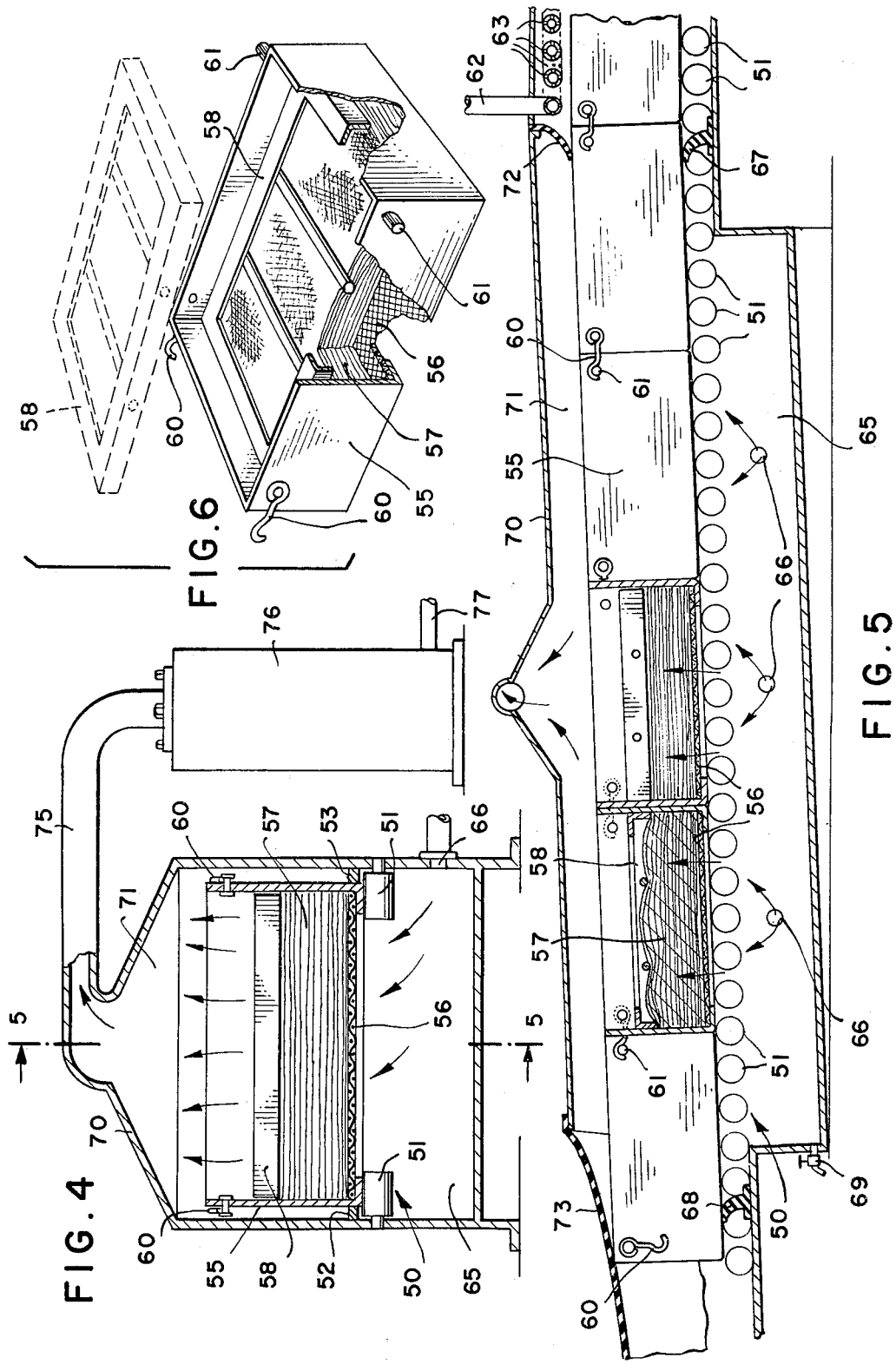

United States Patent Office

3,505,175
Patented Apr. 7, 1970

3,505,175
LIQUID PURIFYING APPARATUS AND METHOD
Robert I. Zalles, San Isidro, Peru, assignor to Latinvestment, Ltd., Nassau, Bahamas, a Bahamas corporation
Filed May 19, 1967, Ser. No. 639,896
Int. Cl. B01d 3/00
U.S. Cl. 203—10                                    18 Claims

ABSTRACT OF THE DISCLOSURE

A liquid purifying apparatus and method in which the liquid to be purified is deposited on a multiplicity of absorbent fibers and forms a thin liquid film around each fiber. The fibers are arranged in a comparatively thick layer which is of annular or planar configuration. Air or other gaseous fluid is directed through the layer to vaporize the liquid films, and the resulting vapor is then condensed and collected.

---

This invention relates to an apparatus and method for purifying liquid, and more particularly to an apparatus and method for rapidly and economically evaporating and then condensing the liquid in a novel and unique manner.

The present invention, while of general application, is particularly well suited for the conversion of impure water into substantially pure or potable water. Thus, the apparatus and method of the invention may be employed for the desalination of sea water, for example. Other advantageous uses for the apparatus and method include the treatment of sewage in sewage disposal plants, the purification of various industrial wastes and in many other liquid purification systems.

The prior apparatus and methods for the purification of liquids have exhibited several disadvantages. Of particular concern heretofore was the comparatively low efficiency and high cost which has been encountered in obtaining liquids of acceptable purity. In addition, several of the apparatus and methods previously employed were incapable of purifying the liquid at a sufficiently high flow rate for many industrial and commercial applications. Furthermore, and this has been of special moment in the conversion of impure water into potable water, it often was difficult to provide commercially acceptable purifying apparatus and processes which were capable of operation on a continuous, day-in and day-out basis.

One general object of this invention, therefore, is to provide a new and improved apparatus and method for the purification of liquid.

More specifically, it is an object of this invention to provide such apparatus and method which exhibit substantially greater efficiency than that attainable heretofore.

Another object of this invention is to provide an apparatus and method of the character indicated in which the liquid may be purified in large quantities.

A further object of this invention is to provide a process for purifying liquids which may be operated continuously over an extended period of time.

Still another object of the invention is to provide a novel apparatus and method for purifying liquid that is economical and thoroughly reliable in operation.

In one illustrative embodiment of the invention, the liquid to be purified is supplied to a layer of fibrous material which includes a multiplicity of liquid absorbent fibers. The individual fibers are coated with the liquid and are exposed to air or other gaseous fluid to vaporize the liquid coatings. The vapor is then condensed, and the resulting condensate is collected in substantially pure form.

In accordance with one feature of the invention, the liquid is applied to the layer of fibrous material in a manner such that it spreads evenly over substantially all of the fibers in the layer and forms an extremely thin liquid film on the surface of each fiber. The layer is of sufficient thickness to sustain a quantity of liquid commensurate with the desired output. In some embodiments the liquid is applied to the fibers through the use of a novel infeed conduit of generally serpentine configuration. As a result of the thin liquid films on the fibers, the liquid is vaporized at a high rate.

In accordance with another feature of the invention, a large volume of gaseous fluid is passed through the layer of fibrous material in a direction substantially transverse to the surfaces of the layer. With this arrangement, the fluid comes in contact with the large area of thin liquid films, formed on substantially all of the fibers in the layer, thereby further improving the overall efficiency of the system.

In accordance with a further feature of the invention, in certain particularly advantageous embodiments, the fibers with the liquid films thereon are continuously directed along a feed path and are led between a pair of opposed chambers. Gaseous fluid is introduced into one of the chambers and passes through the fibers to direct the vaporized liquid into the other chamber and then to a suitable condenser. The arrangement is such that large volumes of the liquid are purified continuously on a day-in and day-out basis.

The present invention, as well as further objects and features thereof, will be understood more clearly and fully from the following description of certain preferred embodiments, when read with reference to the accompanying drawings, in which:

FIGURE 4 is a diagrammatic view, partly in section, of apparatus for purifying liquid in accordance with another illustrative embodiment of the invention;

FIGURE 5 is a sectional view taken along the line 5—5 in FIGURE 4, with portions shown in elevation; and FIGURE 6 is an enlarged perspective view of certain of the components illustrated in FIGURES 4 and 5.

Figure 1:
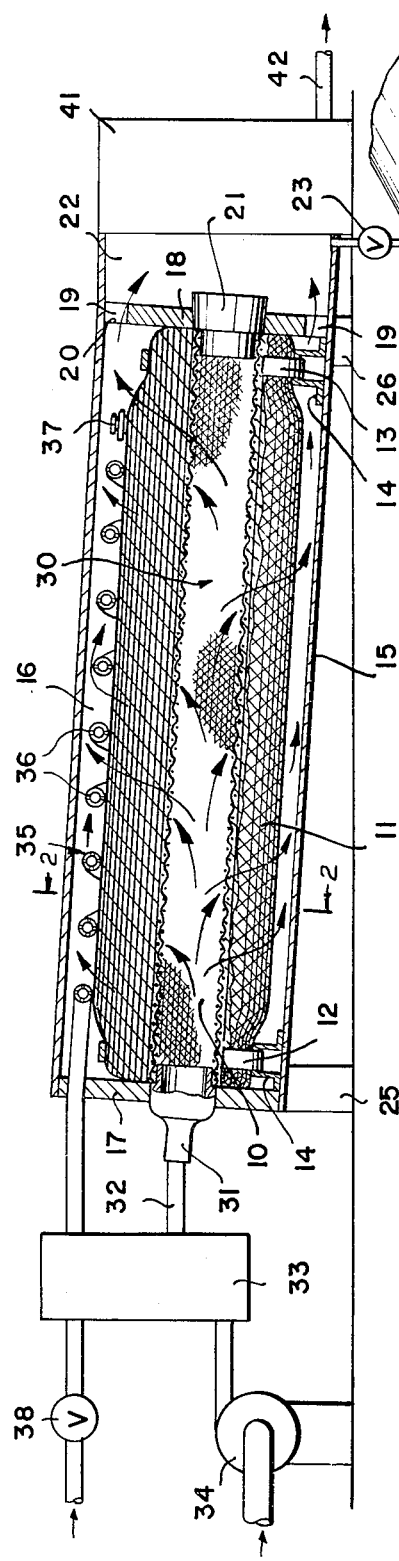
FIGURE 1 is a diagrammatic view, partly in section, of apparatus suitable for purifying liquid in accordance with one illustrative embodiment of the invention.
Figure 3:
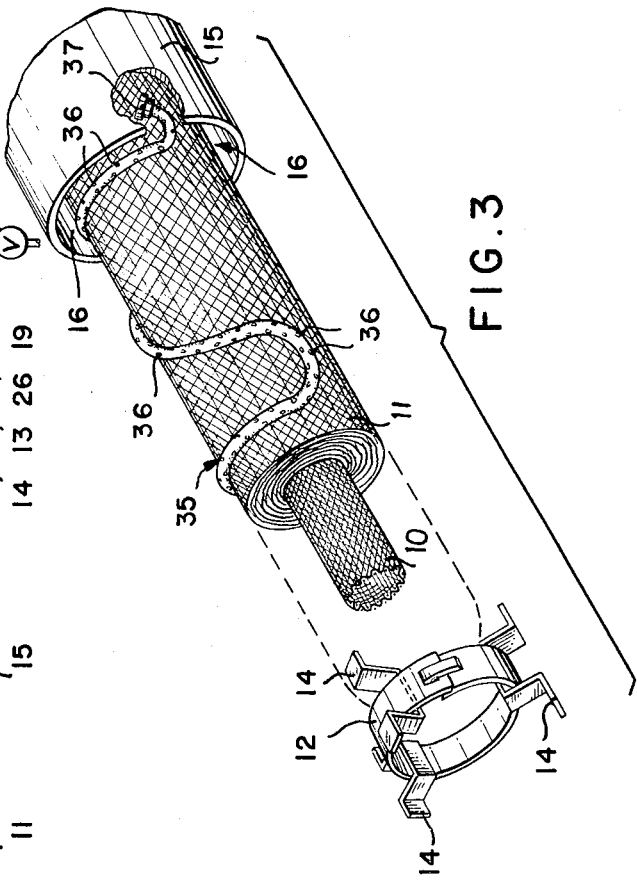
FIGURE 3 is a fragmentary perspective view, with certain parts shown broken away, illustrating the internal structure of a portion of the apparatus of FIGURE 1.
Figure 2:
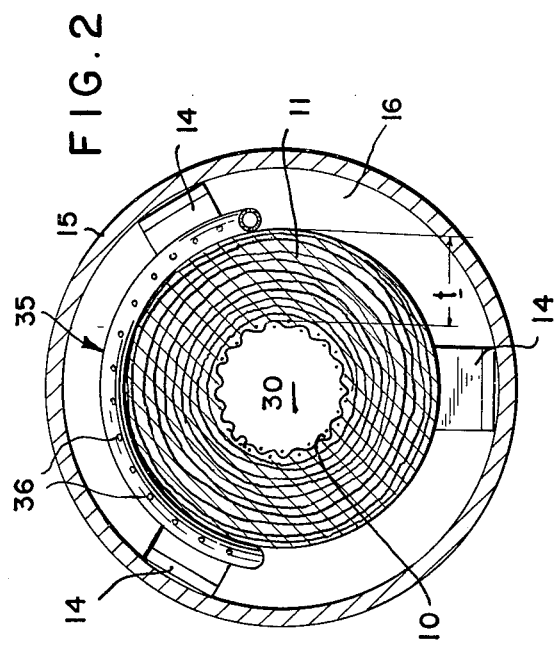
FIGURE 2 is a sectional view taken along the line 2—2 in FIGURE 1.

Referring to FIGURES 1–3 of the drawings, there is shown an apparatus for purifying liquids which is illustrative of certain of the principles of operation of the invention. In the embodiment illustrated in these figures, the apparatus is of generally cylindrical configuration and is disposed along an axis which extends at a slight angle with respect to the horizontal, for purposes that will become more fully apparent hereinafter. In other advantageous embodiments, however, the apparatus may be various shapes and may be mounted horizontally, vertically or in other suitable positions.

The apparatus of FIGURES 1–3 includes a tubular support element indicated generally at 10. The element 10 is of rigid wire mesh construction and is sufficiently open to permit the free flow of gaseous fluid therethrough. Surrounding the element 10 and extending from one end thereof to the other is an absorbent fibrous layer 11. This layer conveniently may comprise a strip of woven material, such as gauze, for example, which is wrapped around the element 10 a number of times to provide a layer having multiple plies and substantial thickness. Although the thickness of the assembled layer may vary over a wide range, depending upon the type of liquid to be purified, the desired output rate, the dimensions of the element 10, etc., in several advantageous embodiments the thickness $t$ (FIGURE 2) of the layer preferably should be at least about 0.50 inch for best results. The layer need not be of woven construction but instead may comprise individual fibers formed in a nonwoven bat of comparatively high porosity. Both the woven and nonwoven layers serve to provide a multiplicity of liquid absorbent fibers which are annularly disposed around the element 10 and include numerous interstices therebetween.

The annular layer 11 is held in place on the support element 10 by two circular clamps 12 and 13. Each of these clamps is provided with a plurality of spacers 14 which are equally spaced about the periphery of the clamp and extend radially therefrom. The spacers 14 maintain the layer 11 in spaced relationship with a tubular shell 15, thus forming an annular chamber 16 therebetween. The inlet end of the shell 15 (the left end, as viewed in FIGURE 1) is closed by a circular plate 17, while a second circular plate 18 is provided within the shell adjacent the right end of the support element 10. The diameter of this latter plate is somewhat less than the inside diameter of the shell 15 to form an annular discharge opening 19 therebetween. The plate 18 is centered within the shell 15 by a plurality of radially extending leg portions 20 and by a centrally located plug 21 which is removably inserted in a corresponding aperture in the plate and protrudes into the adjacent end of the element 10. The shell 15 is somewhat longer than the support element 10 and the fibrous layer 11 to provide and outlet chamber 22 on the side of plate 18 opposite that in contact with the element 10 and the layer 11. A normally closed drain valve 23 is connected to the lower portion of the shell adjacent the chamber 22.

The shell 15 is supported by two cradles 25 and 26. The cradle 25 is positioned adjacent the inlet end of the shell 15, while the cradle 26 is disposed adjacent the outlet end. The height of the cradle 26 is less than that of the cradle 25 to impart a slight slope to the shell. The arrangement is such that any excess liquid within the shell flows by gravity through the opening 19 to the chamber 22. The liquid may be removed from the chamber 22 at periodic intervals by the drain valve 23.

The interior of the tubular support element 10 defines a cylindrical fluid chamber 30 which extends along the axis of the apparatus in coaxial relationship with the annular chamber 16. The fibers within the layer 11 are interposed between these chambers to form a common wall therebetween. One end of the chamber 30 is closed by the plug 21, while the other end is connected by an inlet fitting 31 to a duct 32 which extends through a heating unit shown schematically at 33. The duct 32 is supplied with air or other gaseous fluid under moderate pressure from a blower or compressor 34.

As best shown in FIGURE 3, a generally serpentine conduit 35 extends into the shell 15 and along the upper half of the fibrous layer 11 for substantially the entire length of the layer. The conduit 35 includes a series of small orifices 36 at spaced intervals along its length and is closed at the end within the shell by a plug 37. The opposite end of the conduit 35 is substantially straight and protrudes through a suitable opening in the plate 17. The protruding portion of the conduit passes through the heating unit 33 and is connected to a liquid inlet valve 38.

The liquid to be purified flows through the valve 38 and the conduit 35 into the heating unit 33, where it is heated to a temperature which is of the order of 25° C. to 35° C. above the prevailing ambient temperature. Although temperatures above this range also may be employed, the boiling point of the particular liquid being used should not be exceeded, and for reasons of economy the temperature of the incoming liquid should be sufficient only to provide a moderate temperature differential with respect to ambient temperature. The heated liquid enters the shell 15 and flows along the serpentine conduit 35 and onto the upper half of the fibrous layer 11 from the orifices 36. The arrangement of the fibers within the layer 11 provides a large surface area within a compact space. As the liquid moves onto the layer, it flows by gravity and capillary action into the interstices between the fibers and over substantially all of the fibers to form an extremely thin liquid film on the surface of each fiber. The capillary effect serves to reduce the surface tension of the liquid and enables the formation of a film on each fiber which preferably is only a few molecules in thickness and should not exceed a thickness of about one millimeter. The arrangement is such that a large majority of the liquid molecules comprise surface or boundary layer molecules on the fibers.

A large volume of air or other gaseous fluid is directed by the blower 34 through the heater 33 and along the duct 32 and the fitting 31 into the central chamber 30. The air is heated by the heater 33 to a temperature commensurate with that of the incoming liquid in the conduit 35. The air in the chamber 30 follows a path indicated by the arrows in FIGURE 1 and flows from the chamber through the fibrous layer 11 to the surrounding chamber 16 in a direction which is substantially transverse to the surfaces of the layer. As the air moves through the layer 11, it passes over the multiplicity of fibers therein and comes in contact with the thin liquid films on substantially all of the fibers. The individual molecules of liquid in these films are subjected to almost immediate evaporation and absorption by the air. The liquid vapor from the films is transmitted by the air to the chamber 16, while any impurities in the liquid are retained on the fibers.

The vaporized liquid particles within the chamber 16 are discharged through the annular opening 19, between the plate 18 and the inner wall of the shell 15. The vapor passes through the outlet chamber 22 and into a condensing unit shown schematically at 41. The unit 41 is of conventional construction and is provided with an outfeed conduit 42. Because of the elevated temperature of the vapor, it is readily condensed within the unit 41, and the resulting condensate is collected in substantially pure form from the conduit 42.

The rapid vaporization of the liquid within the interstices of the absorbent fibrous layer 11 produces a drop in temperature which must be taken into account in insuring efficient condensation within the condenser 41. As an illustration, in one exemplary embodiment used for the purification of water, the measured ambient temperature was 26° C., the temperature of the water and air within the respective conduits 35 and 32 was 54° C., and the vapor temperature within the annular chamber 16 was 36° C., thus indicating a drop in temperature due to evaporation of 18° C. Because of the preheating of the water and air in the heating unit 33, the vapor temperature was approximately 10° C. above the ambient temperature, with the result that the vapor was readily condensed to provide the desired liquid output.

In some embodiments, the heating of the incoming liquid and gas may be eliminated, and the condenser 41 may be provided with an appropriate cooling system to enable the realization of the requisite temperature differential for efficient condensation. In still other arrangements, a separate condenser need not be employed, and condensation may take place along the inner cylindrical surface of the shell 15. In these latter embodiments, suitable tubes are disposed around the shell and are supplied with a refrigerating fluid to cool the shell to a temperature approximately 10° C. to 15° C. below ambient temperature. The condensed liquid may be withdrawn from one end of the shell, or the shell may be provided with a spiral-shaped cross-section and the liquid withdrawn from an outlet slot extending from substantially one end of the shell to the other.

The quantity of liquid supplied to the serpentine conduit 35 preferably is sufficient to fully saturate all of the fibers in the absorbent layer 11. In cases in which an excess of liquid is supplied to the layer 11, the excess liquid flows to the lower portion of the shell 15 and proceeds by gravity through the opening 19 to the chamber 22, where the liquid may be drawn off by means of the drain valve 23. The valve 23 also may be employed in connection with the flushing or cleaning of the individual fibers in the layer 11 after repeated usage. To perform such cleaning, the blower 34 is shut down, and water or other purging liquid is pumped through the conduit 35 and into the layer 11. The impurities collected in the layer are entrained by the flow of liquid and are carried out through the opening 19 and the valve 23.

Referring now to FIGURES 4–6, there is shown a liquid purifying apparatus in accordance with another illustrative embodiment of the invention. This latter embodiment is particularly well suited for the desalination of sea water or for other industrial and commercial applications in which large quantities of liquid are to be purified at a high rate on a continuous and economical basis. FIGURE 4 is a transverse section of the apparatus, while FIGURE 5 is primarily a longitudinal section with two of the pan elements of the apparatus cut along slightly different planes to more clearly illustrate the internal structure. One of the pan elements is shown in perspective and partially broken away in FIGURE 6, with a cooperating frame in both full lines and dotted lines to respectively denote its operative and disassembled positions.

As best shown in FIGURE 6, the apparatus includes a conveyor system indicated generally at 50 which is slightly inclined with respect to the horizontal. The system 50 is provided with a series of idler rollers 51 which are arranged on opposite sides of the feed path defined thereby. Two longitudinally extending guide rails 52 and 53 (FIGURE 4) are respectively disposed along the sides of the feed path and are oriented a short distance above the rollers 51.

The rollers 51 support a series of comparatively deep trays or pans 55. As best shown in FIGURE 6, the bottom of each of the pans 55 comprises an open-mesh screen 56 which supports a plurality of layers 57 of fibrous material. These layers have a combined thickness which is substantially the same as that of the fibrous layer 11 (FIGURE 1) described heretofore and are fabricated from generally square sheets of gauze or other open-weave material. The layers are held in place within each pan by a frame 58 which is disposed inside the pan and rests on the uppermost layer.

The pans 55 are detachably interconnected by a pair of hooks 60 on each pan. The hooks 60 are pivotally carried on the sides of the pan adjacent the leading portion thereof and cooperate with two pins 61 on the trailing portion of the immediately preceding pan. The pans are maintained in sufficiently close relationship with each other that the fibrous layers 57 therein may be considered as an almost continuous strip or belt which moves with the pans along the feed path formed by the conveyor 50.

Positioned adjacent the inlet end of the conveyor 50 (the right end, as viewed in FIGURE 5) is a liquid inlet conduit 62. The conduit 62 extends downward and then proceeds along a serpentine path in a horizontal plane immediately above the fibrous material 57 in the pan 55 therebeneath. A series of orifices 63 are provided in the conduit 62 and are generally similar to the orifices 36 (FIGURE 3) described above. The conduit 62 extends over substantially the entire surface area of the uppermost fiber layer in the pan to enable the even flow of the liquid thereto.

Immediate beneath the entral portion of the conveyor 50 is an enlarged chamber 65. The chamber 65 is supplied with air or other gaseous fluid from a plurality of ducts 66 and is provided with appropriate seals 67 and 68 at opposite ends thereof. These seals are somewhat wider than the width of the pans 55 and engage the bottoms of the pans to prevent the escape of substantial quantities of gaseous fluid from the chamber 65. The chamber slopes downwardly in a direction parallel to that of the conveyor and includes a normally closed drain valve 69 at its lowermost portion.

A hood 70 is disposed above the conveyor 50 on the side of the feed path opposite that adjacent the chamber 65. The hood 70 defines a vapor chamber 71 above the pans 55 and includes two seals 72 and 73 adjacent the inlet and outlet portions of the feed path, respectively. The seal 72 is generally similar to the seals 67 and 68 for the chamber 65 and is effective to reduce the escape of vapor from the inlet end of the hood 70. The seal 73 covers a some-what larger area than the seal 72 to prevent substantial vapor loss from the outlet end of the hood. If desired, additional seals (not shown) may be provided along the sides of the feed path above the guide rails 52 and 53 (FIGURE 4), although in many cases the additional seals as well as the seals 67, 68, 72 and 73 may be eliminated without deleterious effects.

The hood 70 includes a centrally located outlet duct 75 which leads to a condenser 76 of conventional construction. The condenser is provided with a discharge conduit 77 for the collection of the condensate.

In operation, the pans 55 are directed in succession along the feed path defined by the idler rollers 51 of the conveyor 50. As each pan moves beneath the serpentine fluid conduit 62, the liquid to be purified flows from the orifices 63 to the uppermost fibrous layer 57. The layers within the pan illustratively comprise overlapping sheets of open-weave cotton gauze or other absorbent material. The liquid proceeds by gravity and capillary action through the multiplicity of paths defined by the interstices between the fibers in the various layers to form an extremely thin liquid film on the surface of each fiber in a manner similar to that described heretofore.

The pans 55 then move between the opposed chambers 65 and 71 and are fed by gravity down the sloping portion of the conveyor 50. During their movement, the pans are guided by the rails 52 and 53. The fibrous layers 57 within the pans form a continuously moving common wall of fibers between the chambers 65 and 71, and each of the fibers includes a thin liquid film on the surface thereof to provide a large surface area for the liquid. A large volume of air or other fluid is introduced into the chamber 65 from the ducts 66, and the air flows through this fibrous wall in a direction substantially transverse to the surfaces of the wall. The air passes over the multiplicity of fibers within the wall and contacts the thin liquid films thereon to produce almost immediate evaporation and entrainment by the air. The liquid vapor is carrier by the air into the chamber 71, where it proceeds along the outlet duct 75 and is condensed in substantially pure form by a suitable refrigerant within the condenser 76. The condensate is collected from the condenser by the conduit 77.

The impurities within the liquid applied to the fibrous layers 57 are retained on the fibers as the pans 55 move between the chambers 65 and 71. As each pan 55 is discharged from the apparatus, it is returned to the infeed side thereof and is again passed between the chambers until such time as the impurities within the fibrous layers build up to an unacceptable level. The layers may then be replaced with clean layers, or the pans may be flushed or subjected to other cleaning procedures to remove the impurities. In cases in which the impurities comprise caked or crusted salts or other solid materials, the layers may be flexed by directing them over one or more sharp edges or through the use of harrow-like devices, for example, to break up the solids sufficiently so that the flow of gaseous fluid is not blocked thereby and all the liquid to be purified passes through the layers. At periodic intervals, the layers are dried and the solid residue is removed in an appropriate cleaning chamber (not shown) disposed along the feed path.

In each of the illustrated embodiments of the invention, it of course will be apparent that the gaseous fluid may be led through the fibrous layers in a direction opposite to the direction specifically described. That is, in the embodiment of FIGURES 1–3 the fluid may be introduced into the annular chamber 16 and passed radially inwardly toward the central chamber 30. Similarly, in FIGURES 4–6 the fluid may proceed downwardly from the chamber 71 to the chamber 65, rather than upwardly in the manner described heretofore.

The pressure of the incoming fluid should be sufficient to insure a continuous fluid flow through the fibrous layer and over the surfaces of substantially all of the fibers therein. In some embodiments the fluid pressure is provided through the use of a blower or compressor in the fluid inlet duct, such as the blower 34 in the duct 32 of FIGURE 1, for example. In other good arrangements, sufficient fluid pressure may be maintained by enclosing the fluid in a series of opaque pipes exposed to the rays of the sun. The fluid within the pipes is heated by the sun and expands sufficiently to provide the requisite inlet pressure. Similarly, the flow of fluid through the apparatus may be maintained by exhausting the liquid vapor at the condenser, or a push-pull arrangement may be employed utilizing both a pressurized fluid input and an exhausted output.

Although the use of liquid absorbent fibers has been described as having particular utility in connection with the invention, in its broadest aspects the invention is not limited to such fibers. As an illustration, one or more layers of comparatively thick open-cell foam or other cellular material may be employed in place of the fibrous layers described heretofore. The individual cells of the material should be interconnected to permit the free passage of gaseous fluid therethrough and to provide a multiplicity of liquid transmitting paths such that the liquid from the inlet conduit may spread by gravity and capillary action through substantially all of the paths. The size and orientation of the cells should be sufficient to enable the formation of thin liquid films in the layer over a large surface area.

The terms and expressions that have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. Liquid purifying apparatus comprising, in combination, means defining a first chamber and a second chamber in juxtaposed relationship with each other, a layer of fibrous material including a multiplicity of fibers interposed between said first and second chambers, means for advancing said fibers along a feed path and between said chambers to form a moving common wall therebetween, means for supplying liquid to be purified to said fibers prior to the time the fibers move between said chambers, said liquid spreading over substantially all of said fibers and forming thin liquid films around the individual fibers, means for directing gaseous fluid into said first chamber and through the fibrous wall into said second chamber, said gaseous fluid passing over said fibers to vaporize the liquid films thereon and transmit the vapor to said second chamber, means communicating with said second chamber for condensing said vapor, and means for collecting the condensate from the condensing means.

2. Liquid purifying apparatus of the character set forth in claim 1, in which the means for supplying liquid to said fibers comprises an inlet conduit of generally serpentine configuration disposed above said fibrous layer, said liquid flowing from said inlet conduit over substantially all of said fibers by gravity and capillary action.

3. Liquid purifying apparatus comprising, in combination, chamber forming means for defining a first chamber and a second chamber in juxtaposed relationship with each other, a layer of fibrous material including a plurality of plies having a multiplicity of liquid absorbent fibers therein, each of said fibers being of a material which is highly absorbent with respect to the liquid to be purified, said layer being interposed between said first and second chambers and forming a common wall therebetween, means for supplying liquid to be purified to said fibers, said liquid spreading over substantially all of said fibers by gravity and capillary action and forming thin liquid films around the individual fibers, means for directing gaseous fluid into said first chamber and through the fibrous wall into said second chamber, said gaseous fluid passing over said fibers to vaporize the liquid films thereon and transmit the vapor to said second chamber, means for maintaining the temperature of the liquid supplied to said fibers at least about 25° C. above the prevailing ambient temperature, means communicating with said second chamber for condensing said vapor, and means for collecting the condensate from the condensing means.

4. Liquid purifying apparatus comprising, in combination, means defining a first chamber of cylindrical configuration, an annular layer of fibrous material disposed around said first chamber and including a multiplicity of liquid absorbent fibers therein, each of said fibers being of a material which is highly absorbent with respect to the liquid to be purified, means defining a second chamber surrounding said annular layer in juxtaposed relationship with said first chamber, said layer being interposed between said first and second chamber and forming a common wall therebetween, means for supplying liquid to be purified into said second chamber and onto the outer surface of said annular fibrous layer, said liquid spreading over substantially all of said fibers by gravity and capillary action and forming thin liquid films around the individual fibers, means for directing gaseous fluid into the first of said chambers and radially through the fibrous wall into the surrounding chamber, said gaseous fluid passing over said fibers to vaporize the liquid films thereon and transmit the vapor to said surrounding chamber, heating means connected to the liquid and gaseous fluid supply means for maintaining the temperature of the incoming liquid and gaseous fluid in excess of the temperature of said vapor, means communicating with said surrounding chamber for condensing said vapor, and means for collecting the condensate from the condensing means.

5. Liquid purifying apparatus of the character set forth in claim 4, in which the thickness of the fibrous layer is at least about 0.50 inch.

6. Liquid purifying apparatus comprising, in combination, conveyor means for defining a feed path, means forming a first chamber and a second chamber in juxtaposed relationship with each other on opposite sides of said feed path, a plurality of layers of fibrous material including a multiplicity of liquid absorbent fibers disposed along said feed path, means including a series of pan members containing said layers for advancing the same along said feed path between said first and second chambers to form a moving common wall therebetween, means for supplying liquid to be purified to said fibers prior to the time the fibers move between said chambers, said liquid spreading over substantially all of said fibers and forming thin liquid films around the individual fibers, means for directing gaseous fluid into said first chamber and through the moving fibrous wall into said second chamber, said gaseous fluid passing over said fibers to vaporize the liquid films thereon and transmit the vapor to said second chamber, means communicating with said second chamber for condensing said vapor, and means for collecting the condensate from the condensing means.

7. Liquid purifying apparatus of the character set forth in claim 6, in which said conveyor means includes a sloping portion for advancing said pan members by gravity along said feed path between said first and second chambers.

8. A method for purifying brackish liquid, comprising the steps of supplying liquid to be purified to a layer of fibrous material including a multiplicity of liquid absorbent fibers, said liquid spreading over substantially all of said fibers and forming thin liquid films around the individual fibers, absorbing a portion of the liquid to be purified within each of said individual fibers, directing gaseous fluid through the fibrous layer in a direction substantially transverse to said layer, said gaseous fluid passing over said fibers to vaporize the liquid film thereon, the gaseous fluid transmitting the liquid vapor to a condenser to condense the same, collecting the resulting condensate, and maintaining a temperature differential between the temperature of the vapor transmitted to said condenser and the temperature of the liquid and gaseous fluid supplied to said fibrous layer.

9. A method for purifying liquid, comprising the steps of supplying brackish liquid to be purified to a layer of fibrous material including a multiplicity of liquid absorbent fibers, heating the liquid supplied to said fibers to a temperature of at least about 25° C. above the prevailing ambient temperature, said liquid spreading over substantially all of said fibers by gravity and capillary action and forming liquid films around the individual fibers, the thickness of the liquid film on each of the fibers in said layer being less than about one millimeter, absorbing a portion of the liquid to be purified within each of said individual fibers, directing gaseous fluid through the fibrous layer in a direction substantially transverse to said layer, said gaseous fluid passing over said fibers to vaporize the liquid films thereon, the gaseous fluid transmitting the liquid vapor to a condenser to condense the same, and collecting the resulting condensate.

10. A method for purifying liquid, comprising the steps of supplying brackish liquid to be purified to a layer of fibrous material including a multiplicity of liquid absorbent fibers, said liquid spreading over substantially all of said fibers by gravity and capillary action and forming thin liquid films around the individual fibers, absorbing a portion of the liquid to be purified within each of said indivdual fibers, drecting gaseous fluid through the brous layer in a direction substantially transverse to said layer, said gaseous fluid passing over said fibers to vaporize the liquid films thereon, maintaining the liquid vapor at a temperature in excess of ambient temperature, transmitting said vapor to a condenser to condsense the same, and collecting the resulting condensate.

11. A method of the character set forth in claim 10, comprising heating both the liquid supplied to said layer and the gaseous fluid directed therethrough to maintain the temperature of said liquid vapor in excess of ambient temperature.

12. A method for purifying liquid, comprising the steps of supplying brackish liquid to be purified to an annular layer of fibrous material including a multiplicity of liquid absorbent fibers, said liquid being deposited on only a portion of said annular layer and spreading by gravity and capillary action over substantially all of the fibers in said layer, to form thin liquid films around the individual gbers, aborbing a portion of the liquid to be purified within each of said individual fibers, directing gaseous fluid into a first chamber formed within said annular layer and then through said layer in a direction substantialy transverse to said layer, said gaseous fluid passing over said fibers to vaporize the liquid films thereon, transmitting the liquid vapor to a second chamber surrounding said annular layer and then to a condenser separate from said second chamber to condense said vapor, collecting the resulting condensate, and maintaining a temperature differential between the temperature of the vapor transmitted to said condenser and the temperature of the liquid and gaseous fluid supplied to said fibrous layer.

13. A method of the character set forth in claim 12, in which the liquid to be purified is supplied to said annular layer along a serpentine path.

14. A method of the character set forth in claim 12, in which the thickness of the liquid film formed on each of said fibers is less than about one millimeter.

15. A method for purifying liquid, comprising the steps of continuously advancing a plurality of overlapping layers of fibrous material along a feed path and between a first chamber and a second chamber on opposite sides of said path, the thickness of the combined layers being at least about 0.05 inch and each of said layers including a multiplicity of liquid absorbent fibers, supplying liquid to be purified to one of said layers prior to the time the fibers move between said chambers, said liquid spreading over substantially all of the fibers in each of said layers and forming thin liquid films around the individual fibers, directing gaseous fluid into said first chamber disposed on one side of said feed path and then through the fibrous layers in a direction substantially transverse to said layers, said gaseous fluid passing over the fibers in each of said layers to vaporize the liquid films thereon, transmitting the liquid vapor to said second chamber disposed on the side of said feed path opposite said first chamber and then to a condenser separate from said second chamber to condense said vapor, and collecting the resulting condensate.

16. In liquid treating apparatus, in combination, conveyor means for defining a feed path, means forming a first chamber and a second chamber in juxtaposed relationship with each other on opposite sides of said feed path, a layer of porous material disposed along said feed path, said layer including a multiplicity of liquid transmitting paths therethrough, means for advancing said layer along said feed path between said first and second chambers to form a moving common wall therebetween, means for supplying liquid to said layer prior to the time the layer moves between said chambers, said liquid spreading through substantially all of the paths in said layer and forming thin liquid films therein over a large area, and means for directing gaseous fluid into said first chamber and through the moving porous wall into said second chamber, said gaseous fluid passing over said liquid films to vaporize the same and transmit the vapor to said second chamber.

17. In a liquid treating apparatus, in combination, means for defining a feed path, means forming a first chamber and a second chamber in juxtaposed relationship with each other on opposite sides of said feed path, a layer of fibrous material including a multiplicity of liquid absorbent fibers disposed along said feed path, means for advancing said layer along said feed path between said first and second chambers to form a moving common wall therebetween, means for supplying liquid to said fibers prior to the time the fibers move between said chambers, said liquid spreading over substantially all of said fibers and forming thin liquid films around the individual fibers, and means for directing gaseous fluid into said first chamber and through the moving fibrous wall into said second chamber, said gaseous fluid passing over said fibers to vaporize a liquid films thereon and transmit the vapor to said second chamber.

18. Liquid treating apparatus comprising, in combination, means for defining a feed path, means forming a first chamber and a second chamber in juxtaposed relationship with each other on opposite sides of said feed path, a plurality of layers of fibrous material including a multiplicity of liquid absorbent fibers disposed along said feed path, means for advancing said layers along said feed path between said first and second chambers to form a moving common wall therebetween, means for supplying liquid to said fibers prior to the time the fibers move between said chambers, said liquid spreading over substantially all of said fibers and forming thin liquid films around the individual fibers, means for directing gaseous fluid into said first chamber and through the moving fibrous wall into said second chamber, said gaseous fluid passing over said fibers to vaporize the liquid films thereon and transmit the vapor to said second chamber, means communicating with said second chamber for condensing said vapor, and means for collecting the condensate from the condensing means.

References Cited

UNITED STATES PATENTS

| | | | |
|---|---|---|---|
| 1,409,364 | 3/1922 | Dobbs et al. | 55—90 X |
| 2,147,248 | 2/1939 | Fleisher | 55—90 X |
| 2,259,762 | 10/1941 | McKee | 203—89 X |
| 2,935,200 | 5/1960 | Lutz et al. | 210—330 X |
| 3,177,126 | 4/1965 | Charreau | 202—48 |
| 3,370,401 | 2/1968 | Lucas et al. | 55—90 |

SAMIH N. ZAHARNA, Primary Examiner

J. W. ADEE, Assistant Examiner

U.S. Cl. X.R.

55—91, 257; 202—234, 236; 203—49, 89; 210—71, 328; 261—80